United States Patent [19]

Mikami

[11] Patent Number: 5,436,732
[45] Date of Patent: Jul. 25, 1995

[54] IMAGE DATA PROCESSING SYSTEM

[75] Inventor: Kazuhiko Mikami, Saitama, Japan

[73] Assignee: Fuji Xerox Co., Ltd., Tokyo, Japan

[21] Appl. No.: 947,917

[22] Filed: Sep. 21, 1992

[30] Foreign Application Priority Data

Sep. 26, 1991 [JP] Japan ................. 3-274667

[51] Int. Cl.6 ............................................. H04N 1/21
[52] U.S. Cl. .................... 358/444; 358/404; 358/443; 358/450
[58] Field of Search ............... 358/444, 434, 167, 443, 358/494, 257, 256, 280, 285, 293, 135, 136, 133, 260, 174, 160, 21, 27, 404, 401, 449, 451, 296, 257, 256, 287, 450, 453, 448, 474; 360/38.1, 53; 382/49, 17, 41, 43; 395/158, 157; 364/521, 523, 518; 340/711, 724, 712

[56] References Cited

U.S. PATENT DOCUMENTS

| 4,604,748 | 8/1986 | Sato ................................... 360/38.1 |
| 4,674,125 | 6/1987 | Carlson et al. ......................... 382/49 |
| 4,772,956 | 9/1988 | Roche et al. . |
| 4,876,609 | 10/1989 | Ogura ................................... 358/443 |
| 4,918,541 | 4/1990 | Ushida et al. . |
| 4,931,957 | 6/1990 | Takagi et al. ......................... 364/521 |
| 4,949,176 | 8/1990 | Levy ................................... 358/135 |
| 5,005,082 | 4/1991 | Zdepski et al. ......................... 358/174 |
| 5,014,198 | 5/1991 | Umemura . |
| 5,016,114 | 5/1991 | Sakata et al. ......................... 358/404 |
| 5,051,843 | 9/1991 | Hayashi ................................... 358/450 |
| 5,091,866 | 2/1992 | Takagi ................................... 395/158 |
| 5,105,284 | 4/1992 | Sakata et al. ......................... 358/404 |

FOREIGN PATENT DOCUMENTS 62-176374A 8/1987 Japan .

Primary Examiner—Paul Ip
Attorney, Agent, or Firm—Finnegan, Henderson Farabow, Garrett & Dunner

[57] ABSTRACT

An image data processing system which divides image data of an image of one page into segmental image data and processes the segmental image data at a high speed. The image data processing system includes companders for respectively processing the segmental image data, temporary data storage units each having a small memory capacity for temporarily storing the processed data, and a coded data storage unit having a large memory capacity for storing the data supplied from the temporary data storage units in the order of data arrival.

6 Claims, 6 Drawing Sheets

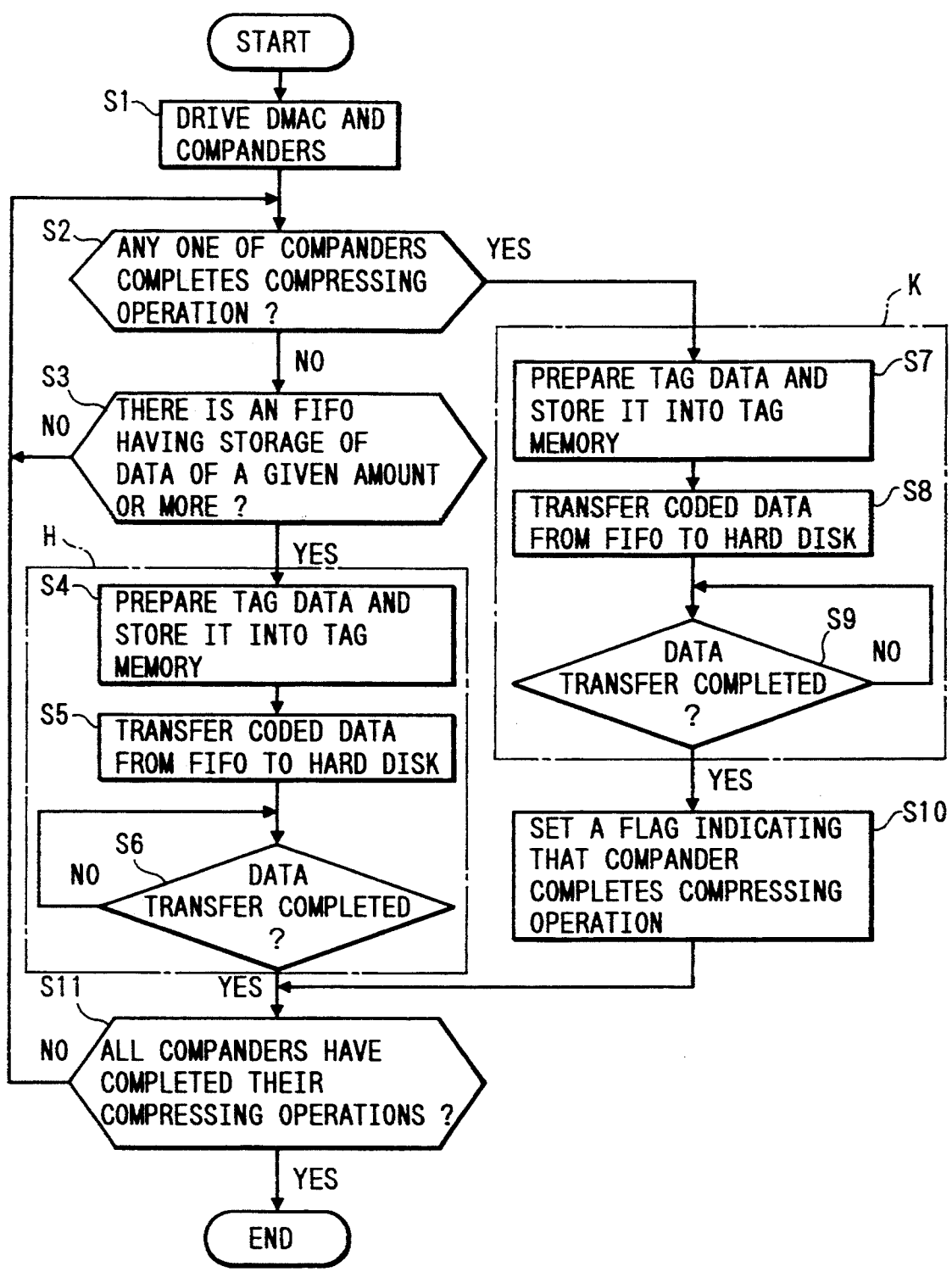

IMAGE DATA PROCESSING SYSTEM

BACKGROUND OF THE INVENTION

The present invention relates to an image data processing system which divides image data of an image of one page into segmental image data and processes the segmental image data at a high speed.

There is known an image data processing system for compressing and expanding image data at a high speed. In the image data processing system, image data of an image of one page is divided into segmental image data, and companders are provided respectively in association with the segmental image data. A conventional image data processing system will be described with reference to FIG. 7. In this figure, reference numeral 1 designates a micro processor unit (MPU); 2, a direct memory access controller (DMAC); 3, an image input terminal (IIT); 4, an image output terminal (IOT); 5, an image memory; 6-1, 6-2, . . . and 6-$n$, companders; 7, an image data bus; 8, an coded data memory; and 8-1, 8-2, . . . and 8-$n$, segmental memory areas for coded data storage. The image memory 5, which has a memory capacity of storing image data of one page, is called a page memory.

FIG. 8 is a diagram showing segmental images making up an image of one page. In the figure, reference numeral 20 designates an image of one page; 20-1, 20-2, . . . and 20-$n$, segmental images (in this instance, an image of one page is divided into an n number of segmental images). The image data processing system of FIG. 7 includes the companders, which are provided respectively in association with the segmental images. The compander 6-1 is employed for compressing and expanding the image data of the segmental image 20-1, and the compander 6-2, for compressing and expanding the image data of the segmental image 20-2.

The data coded by the companders are stored into the coded data memory 8. The memory area of the memory 8 is also divided into an n number of the segmental memory areas, which is equal to the number of segmental images. Those segmental areas are denoted as 8-1 to 8-$n$ shown in FIG. 7. The segmental memory areas are made to correspond to the companders respectively, and store the data coded by the companders. If the segmental memory area 8-1 corresponds to the compander 6-1, it stores the data coded by the compander 6-1.

The operation of the image data processing system thus arranged will be described. Image data read by the IIT 3 is stored into the image memory 5. The image data is transferred from the image memory 5 to the companders 6-1 to 6-$n$ where the data is compressed. The companders process, in a parallel manner, the image data of the narrow segmental memory areas resulting from division of the one-page image. Accordingly, the time taken for the companders to complete the image data processing is much shorter than that taken for a single compander to complete data processing of the image in the entire area of one page. The data coded by the companders are stored into the corresponding segmental memory areas, respectively. The data transfer is performed under control of the DMAC 2.

To output image data, the segmental image data are read out of the segmental memory areas and supplied to the corresponding companders where the data are expanded. The expanded image data are transferred to the image memory 5 where the image data are composed into the image data of one page. Thereafter, the image data of one page is transferred to the IOT 4 which in turn produces the image data in the visual form. Also in this case, it is noted that the expanding processings in the respective segmental areas concurrently proceed. Therefore, the processing speed is much higher than that of the expanding processing carried out by a single compander.

An example of the conventional technique as stated above is disclosed by Japanese Patent Unexamined Publication No. Sho. 62-176374.

The image data processing system thus far described involves such a problem that the image memory for coded data storage is inefficiently used, with a relatively large part of the memory area being left unused or empty.

FIG. 9 shows a set of diagrams for explaining states of data storage in the segmental memory areas 8-1 to 8-$n$. In the figure, character A designates a data storage area, and Z designates an empty area. Where the one-page image 20 is divided into the n number of segmental images, as shown in FIG. 8, the compression ratio of the image data depends on a degree of complexity of each segmental image. In a certain page, its segmental image 20-1 may be complex. In this case, the compression ratio of the segmental image is low. When the data is coded, the resultant data or coded data is large in amount. In another page, its segmental image 20-1 may be simple. In this case, the compression ratio is high, and the coded data is small in amount. Thus, it is almost impossible to predict the compression ratios of the image data of the respective segmental images.

For the above reason, the segmental memory area 8-1 must have a memory capacity large enough to store the coded data indicative of the segmental image which is most complex. Practically,, not all the segmental images can be most complex, though. Accordingly, relatively large areas Z are usually left empty, as shown in FIG. 9, in the segmental memory areas 8-1 to 8-$n$. Thus, use of the image memory for coded data storage is inefficient, with a relatively large part of the memory area being left empty. This inefficient use of the image memory becomes more remarkable as the number of segmental images is increased for high speed processing.

SUMMARY OF THE INVENTION

Accordingly, the present invention has an object to solve the problems mentioned above.

To attain the above object, the present invention provides an image data processing system including companders for respectively processing data of segmental images, temporary data storage means having a small memory capacity for temporarily storing processed data, the temporary data storage means being provided respectively in association with the companders, and coded data storage means having a large memory capacity for storing the data supplied from the temporary data storage means in the order of data arrival.

BRIEF DESCRIPTION OF THE DRAWINGS

FIG. 5 is a flowchart showing the compressing operation of the image data processing system of FIG. 1;

DETAILED DESCRIPTION OF THE PREFERRED EMBODIMENTS

Figure 1:
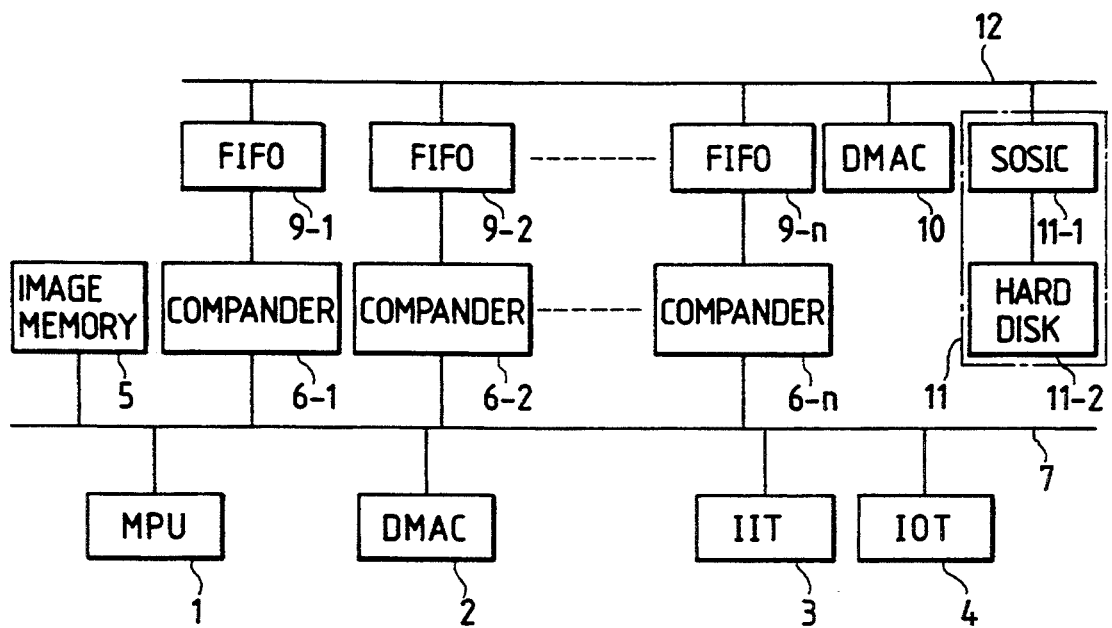
FIG. 1 is a block diagram showing an image data processing system according to a first embodiment of the present invention.
Figure 7:
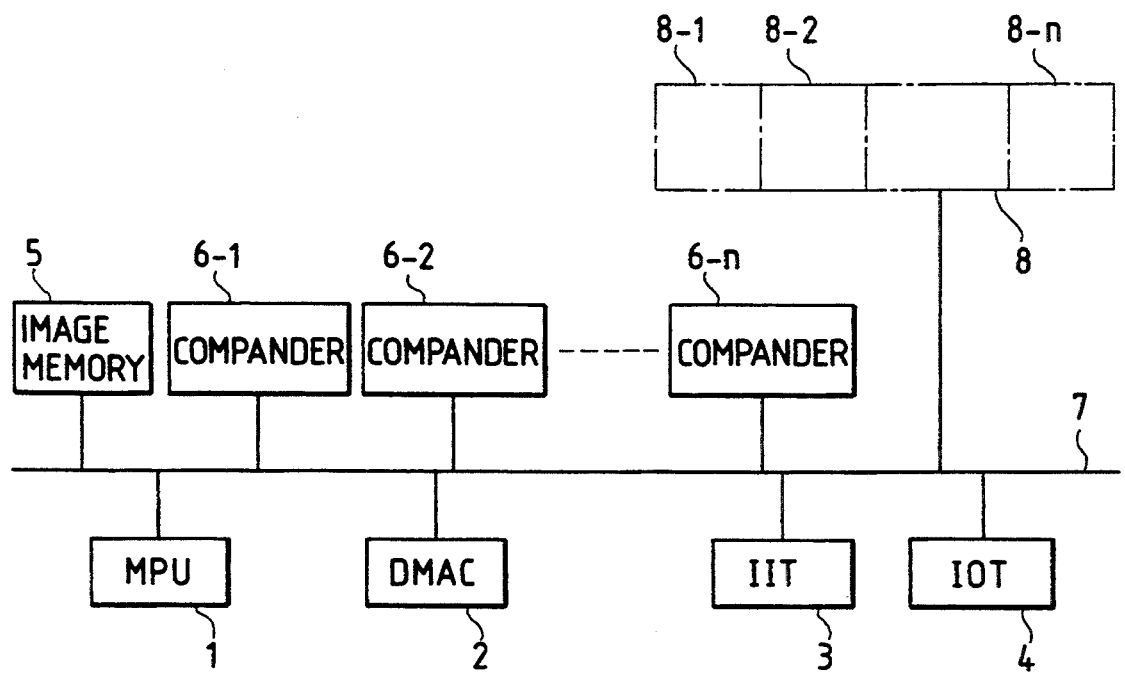
FIG. 7 is a block diagram showing a conventional image data processing system.

The preferred embodiments of the present invention will be described with reference to the accompanying drawings. FIG. 1 is a block diagram showing a first embodiment of the present invention. In the figure, like reference numerals are used for designating like or equivalent portions in FIG. 7 already referred to. Reference numerals 9-1, 9-2, . . . and 9-$n$ designate FIFOs (first-in first-out); 10, a DMAC; 11, a coded data storing means; 11-1, a SCSI controller; 11-2, a hard disk; and 12, a local DMA bus. The SCSI controller 11-1 is a known interface for the hard disk. The DMAC 10 is provided for controlling data transfer between the FIFOs 9-1 to 9-$n$ and the coded data storing means 11.

The coded data storing means 11 is appropriately selected according to the size and complexity of an image to be processed. In order to process large and complex images, a hard disk rather than a RAM is preferable because a hard disk is cheaper and has a larger memory capacity.

Also in the invention, in order to secure a high speed processing, an image of one page is divided into an n number of segmental images. These segmental images are processed by an n number of the companders 6-1 to 6-$n$ in a parallel manner. However, memory areas for respectively storing the data coded by the compression are not employed. In place of them, the FIFOs 9-1 to 9-$n$ as temporary data storing means of small memory capacity are provided in association with the companders 6-1 to 6-$n$, respectively. The data is transferred to the coded data storing means 11 from a FIFO once the stored data in the FIFO reaches a given amount of data; data is then transferred from another FIFO in which the stored data reaches the given amount of data, and so on.

In a specific example where the FIFOs 9-1 to 9-$n$ each has the memory capacity of 2 KB (kilo bytes) and the given amount is 1 KB, when in any one of the FIFOs the data stored reaches 1 KB, the data of 1 KB is read en bloc (one block data) from the FIFO and transferred to the coded data storing means 11.

Figure 2:
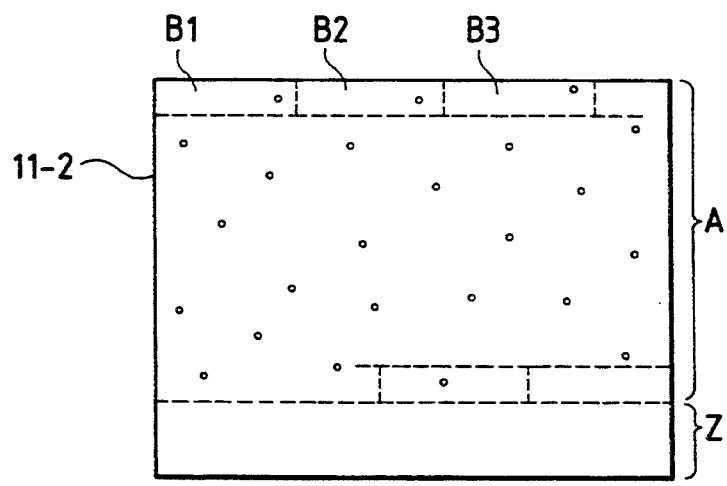
FIG. 2 is a diagram showing a state of data storage in a hard disk in the image data processing system.

FIG. 2 is an explanatory diagram showing a state of data storage in the hard disk 11-2 used in the coded data storing means 11. In the figure, reference character A designates a storage area; Z, an empty area; and B1 to B3, storage blocks. Data is stored into the hard disk 11-2 in data blocks from the FIFOs. The storage blocks B1 to B3 are memory areas each storing one data block. If the data block is 1 KB, the storage block B1, for example, has 1 KB.

The hard disk 11-2 stores the data in data blocks supplied from the FIFOs in the order as stated above, in an accumulative manner. Accordingly, in the hard disk 11-2, the coded data from the compander 6-1 are separately stored adjacent to the previously stored data from other companders, that is, not located en bloc at a memory area. Accordingly, tag data identifying the companders of the stored data blocks are prepared and stored in a tag memory.

Figure 3:
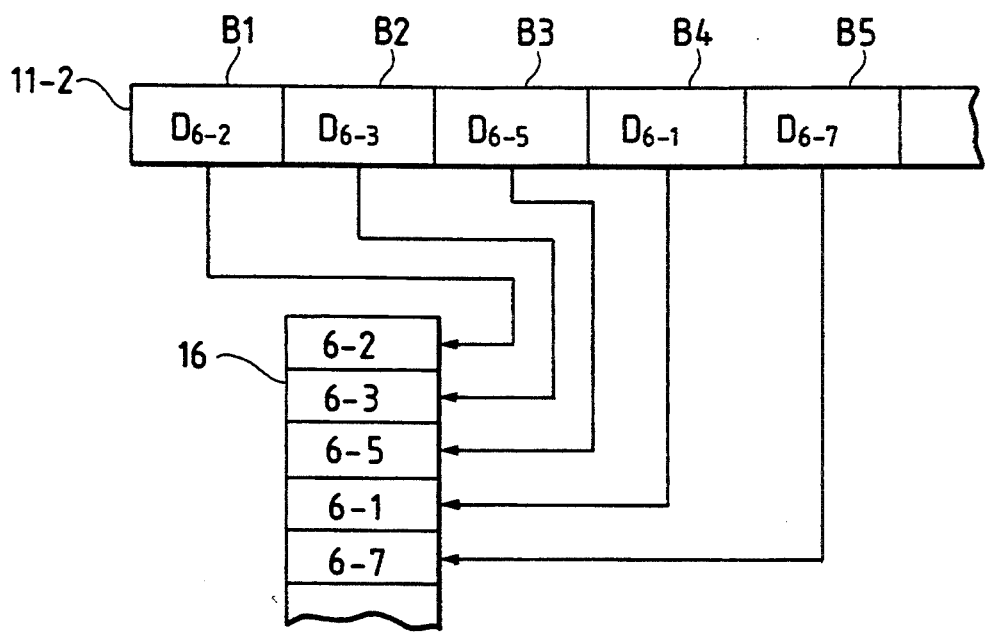
FIG. 3 is a diagram showing storage of tag data in a tag memory.

FIG. 3 is a diagram showing storage of tag data in a tag memory. In the figure, like reference numerals designate like portions in FIG. 2. Reference numeral 16 designates a tag memory. $D_{6\text{-}1}$ to $D_{6\text{-}7}$ indicate data blocks. If coded data stored in the first storage block B1 of the hard disk 11-2 is supplied by compander 6-2 (viz., data block $D_{6\text{-}2}$ from the FIFO 9-2), data "6-2" indicating that the data block is output from the compander 6-2 is stored in the first memory location of the tag memory 16. Similarly, when the data blocks stored in the storage blocks B2, B3, B4 and B5 are output from the companders 6-3, 6-5, 6-1 and 6-7, data "6-3", "6-5", "6-1" and "6-7" are successively stored in the tag memory 16 in this order.

FIG. 5 is a flowchart showing the compressing operation of the image data processing system thus arranged.

Figure 8:
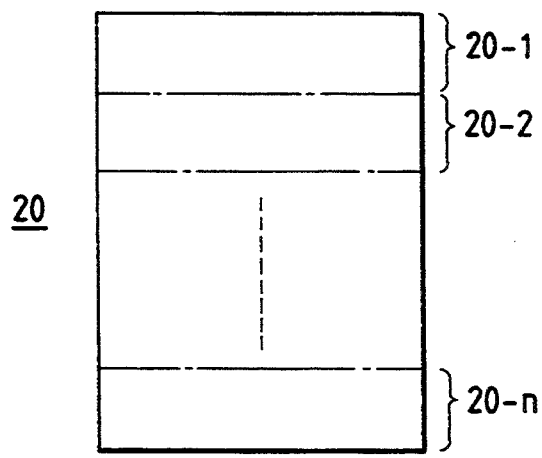
FIG. 8 is a diagram showing segmental images making up an image of one page.
Figure 9:
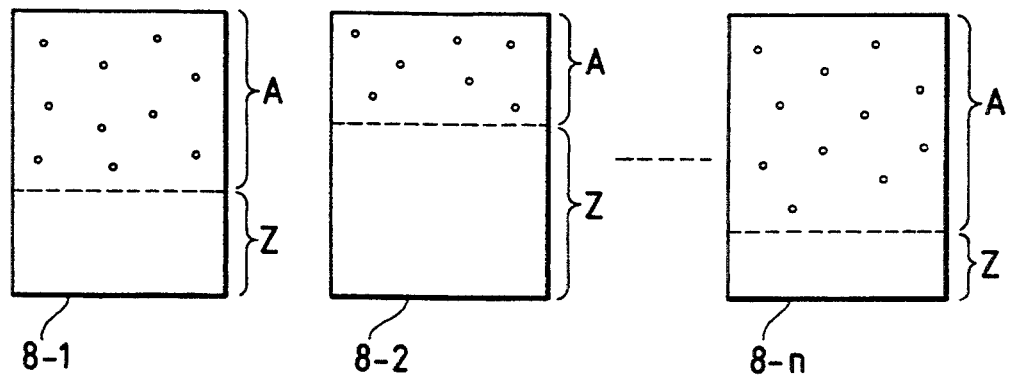
FIG. 9 is a set of diagrams for explaining states of data storage in the segmental memory areas.

Step S1: The image 20 of one page stored in the image memory 5 is divided into segmental images 20-1 to 20-$n$ (see FIG. 8), and the DMAC 2 is driven to transfer the segmental image data to the companders 6-1 to 6-$n$. Further, the companders 6-1 to 6-$n$ are driven to process the segmental image data.

Step S2: Control checks as to if any one of the companders 6-1 to 6-$n$ completes the compressing operation of the segmental image data. If a compander completes the compression, control advances to step S7 in preparation for transferring the last coded data of the segmental image to the coded data storing means 11.

Figure 4A:
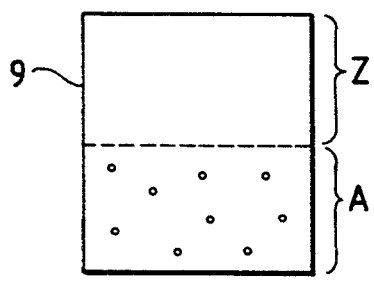
FIGS. 4(a) and 4(b) are diagrams for explaining states of data storage in the FIFO.
Figure 4B:
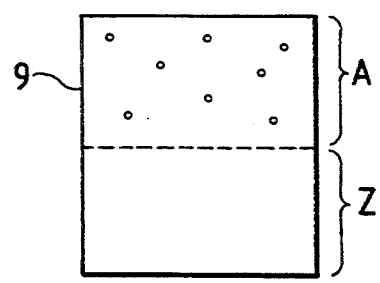

Step S3: If it does not yet complete the compression, control checks as to if there is a FIFO having storage of data of a given amount or more. FIGS. 4(a) and 4(b) show diagrams for explaining states of data storage in the FIFO. In the figure, reference character A designates a storage area; Z, an empty area. FIG. 4(a) is a diagram showing a state of data storage where a given amount of data has been stored (e.g., data of 1 KB has been stored and the memory capacity of the FIFO 9 is 2 KB). If the amount of the stored data in a FIFO does not yet reach the given amount, control returns to step S2. If the given amount of data has been stored, control advances to step S4 in preparation for transferring the given amount of data en bloc to the coded data storing means 11.

Step S4: A group H of steps including step S4 to step S6 describes a sequence of procedural steps of such an operation that when the coded data is stored up to the given amount in the corresponding FIFO during the course of compressing the segmental image data, the coded data stored is transferred en bloc to the coded data storing means 11. In step S4, control prepares tag data on the coded data to be transferred, and stores it into the tag memory 16. As in the case of FIG. 3, when the given amount of coded data stored in the FIFO 9-2 associated with the compander 6-2 is to be transferred, tag data of "6-2" is prepared and stored into the tag memory 16.

Step S5: The coded data from the FIFO is transferred to the coded data storing means 11. If the hard disk 11-2 is used for the coded data storing means 11, the data is transferred to the hard disk 11-2.

Step S6: Control checks as to if the data transfer is completed.

Step S7: A group K of steps including step S7 to step S9 describes a sequence of procedural steps of such an operation that when the compander, which is compressing the data of any of the segmental images, completes its compressing operation, the coded data left in the FIFO is transferred to the coded data storing means 11. This is the last data transfer of the coded data of the segmental image. In this case most of the data left in the FIFOs is smaller than the given amount of data as the data unit for data transfer to the coded data storing means 11 (because when the data is stored up to the given amount, the data should be transferred in the procedure of the step group H). After the compressing operation terminates, no further data will be stored in the FIFOs, so that the stored data will never reach the given amount of data. For this reason, the last coded data must be forcibly discharged from the FIFOs. The process for effecting the forcible discharge of the data left is executed by the step group K. In step S7, as in step S4, tag data is prepared and stored into the tag memory 16.

Step S8: Coded data from the FIFO associated with the compander having completed its compressing operation is transferred to the coded data storing means 11.

Step S9: Control checks as to if the data transfer is completed.

Step S10: When a compander has transferred the final coded data, control sets a flag indicating that the compander has completed the compressing operation.

Step S11: Control checks the flags that are set to know whether or not all the companders have completed their compressing operations. If a flag or flags not yet set are present, control returns to step S2.

Figure 6:
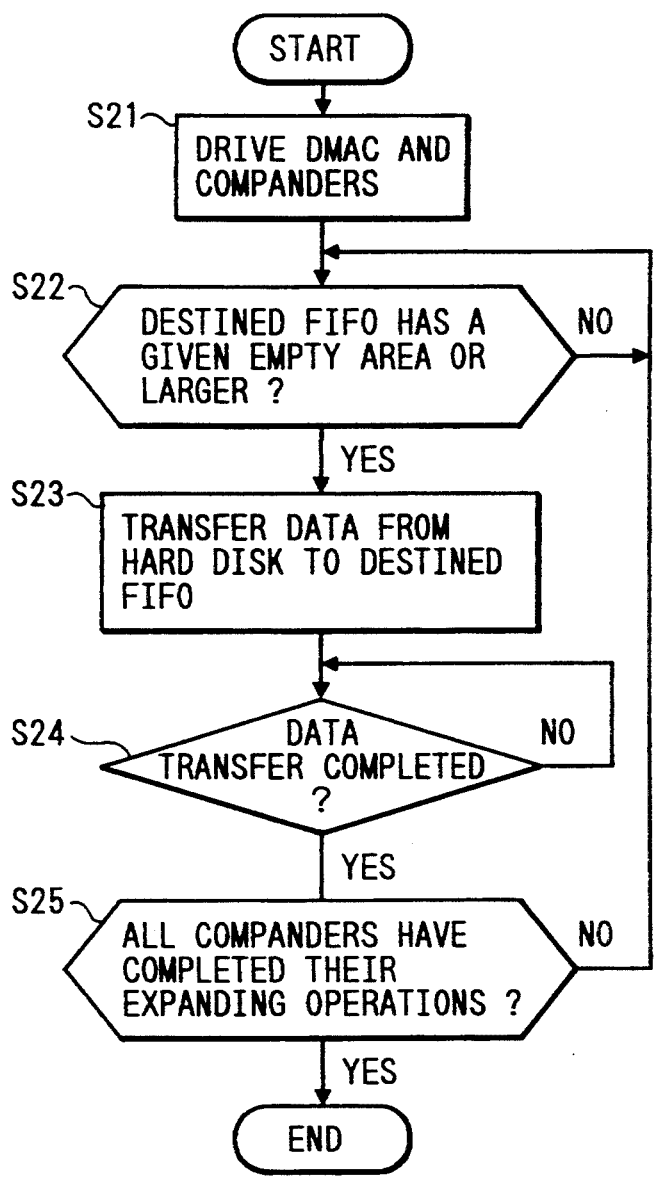
FIG. 6 is a flowchart showing the expanding operation of the image data processing system of FIG. 1.

FIG. 6 is a flowchart showing the expanding operation of the image data processing system of FIG. 1.

Step S21: The DMAC 2 and the companders 6-1 to 6-n are driven. By driving the DMAC 2, preparation is made for transferring the data expanded by the compander to the image memory 5.

Step S22: The data is read out of the coded data storing means 11 in the order of storage, and is respectively transferred to the FIFOs associated with the companders corresponding to the read-out data. The FIFOs to which the read-out data is to be destined can be readily known from the tag memory 16 shown in FIG. 3. At this time, control checks whether or not the destined FIFO has a given empty area Z or larger. This check is made to ensure that the data is transferred in the data unit (e.g., 1 KB) as in the case of the data storage; the FIFO must have enough empty area to store the given amount of data. FIG. 4(b) shows a state of data storage in the FIFO in which the empty area Z is large enough to store the given amount of data. The data transfer is under control of the DMAC 10.

Step S23: If the destined FIFO has the given empty area Z, the data is transferred from the coded data storing means 11 to the FIFO. In a specific example, the data "6-2" stored in the tag memory 16 indicates that data block $D_{6-2}$ stored in the first memory location of the hard disk 11-2 shown in FIG. 3 is destined for FIFO 9-2 which is associated with compander 6-2. Accordingly, the data is transferred to the FIFO 9-2.

Step S24: Control checks as to if the data transfer is completed.

Step S25: Each compander fetches the transferred data from the FIFO associated therewith, and expands the data and transfers the expanded data to the image memory 5. Control checks as to if all the companders have completed their expanding operations. If not yet completed, control returns to step S22.

In the image data processing system thus operated, the hard disk 11-2 can be designed to have a proper memory capacity, allowing for the total amount of transferred data. Accordingly, the memory can be efficiently used with the smallest possible empty area Z, and the cost to manufacture the coded data storing means is reduced.

Figure 10:
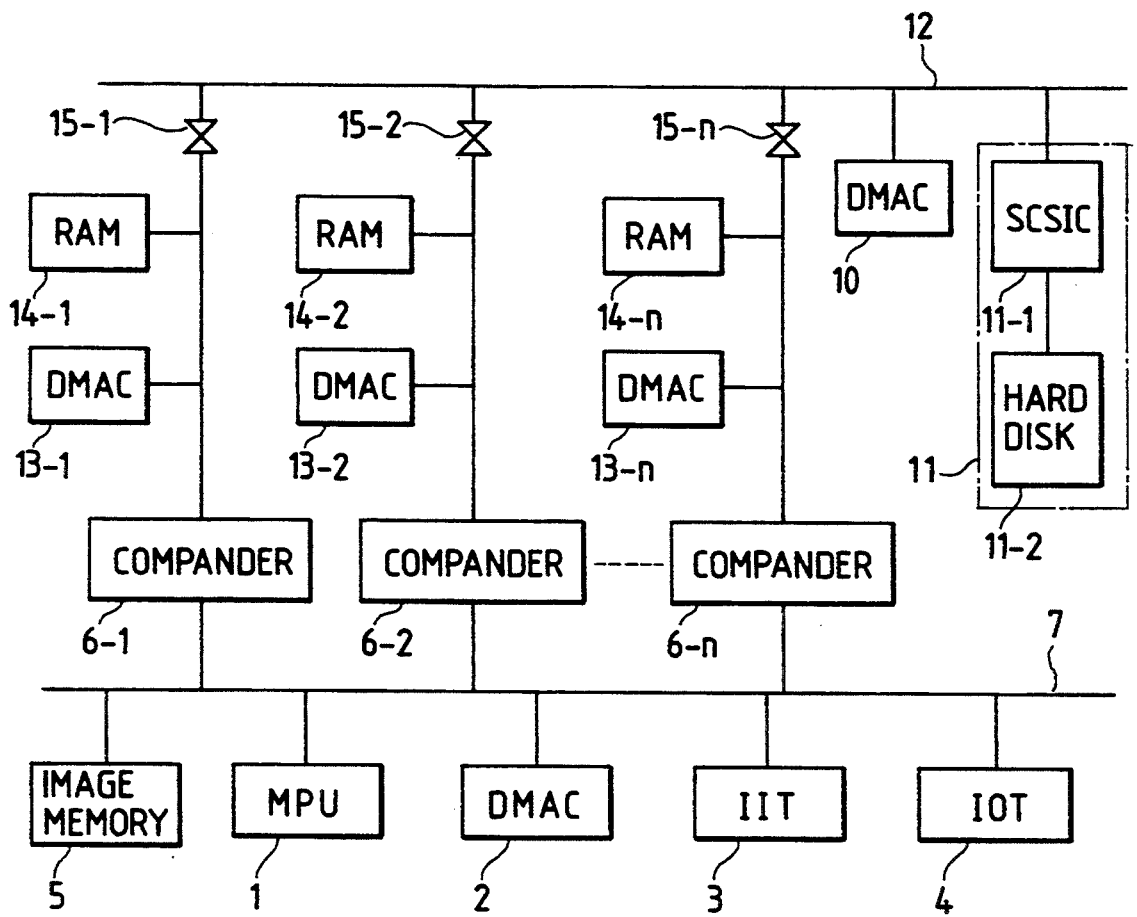
FIG. 10 is a block diagram showing an image data processing system according to a second embodiment of the present invention.

FIG. 10 is a block diagram showing an image data processing system according to a second embodiment of the present invention. In the figure, like reference numerals designate like or equivalent portions in FIG. 1. Reference numerals 13-1, 13-2, ... and 13-n designate DMACs; 14-1, 14-2, ... and 14-n, random access memories (RAMs); and 15-1, 15-2, ... and 15-n, bidirectional buffers. In the second embodiment, RAMs 14-1 to 14-n, in place of the FIFOs that are used in the first embodiment (FIG. 1), are used for the temporary data storing means of small memory capacity, which are provided in association with the companders. Use of the RAMs is attendant with the DMACs 13-1 to 13-n, and the bidirectional buffers 15-1 to 15-n. The DMACs 13-1 to 13-n are provided for controlling the data transfer from the companders 6-1 to 6-n to the RAMs 14-1 to 14-n.

When data is transferred from the RAM 14-1 toward the coded data storing means 11, the DMAC 10 issues an instruction to the bidirectional buffer 15-1 which in turn permits the data transfer in that direction. In an expanding mode, the data must be transferred in the reverse direction. Accordingly, the DMAC 10 issues an instruction to the bidirectional buffer 15-1 which in turn permits the data transfer in the reverse direction. Other operations of the second embodiment are similar to those of the first embodiment, and hence no further description will be given here. The coding method for the compression and expansion may be any one of the known coding methods, such as MH, MR and MMR methods.

As seen from the foregoing description, in the image data processing system of the invention, the number of companders used is equal to that of segmental images. However, a single memory is used for finally storing the coded data output from all the companders. The coded data is accumulatively stored in the memory used common to the companders. This leads to reduction of the cost to manufacture the system.

What is claimed is:

1. An image data processing system comprising:
   a plurality of companders for respectively processing data of segmental images;
   a plurality of temporary data storage means respectively coupled to said companders; each of said temporary data storage means having a small memory capacity for temporarily storing processed data received from the respectively coupled compander; and
   coded data storage means coupled to said temporary data storage means and having a large memory capacity for storing the data supplied from said temporary data storage means in the order of data arrival.

2. The image data processing system according to claim 1, wherein each said temporary data storage means includes a first-in first-out memory.

3. The image data processing system according to claim 1, wherein each said temporary data storage means includes a random access memory.

4. The image data processing system according to claim 1, wherein said coded data storage means includes a hard disk.

5. The image data processing system according to claim 1, wherein every time a fixed amount of data is stored in each said temporary data storage means, the data stored is transferred to said coded data storage means.

6. The image data processing system according to claim 1, wherein said coded data storage means includes memory means for storing data indicating a correspondence between coded data and the compander outputting the coded data.

* * * * *